(12) United States Patent
Kikuchi et al.

(10) Patent No.: US 7,362,353 B2
(45) Date of Patent: Apr. 22, 2008

(54) AUTOFOCUS LENS APPARATUS AND IMAGE PICKUP SYSTEM

(75) Inventors: Takayuki Kikuchi, Tokyo (JP); Isao Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 877 days.

(21) Appl. No.: 10/659,197

(22) Filed: Sep. 9, 2003

(65) Prior Publication Data

US 2004/0046890 A1    Mar. 11, 2004

(30) Foreign Application Priority Data

Sep. 9, 2002   (JP)   ............... 2002-262797
Sep. 1, 2003   (JP)   ............... 2003-308491

(51) Int. Cl.
*H04N 5/225*   (2006.01)
*H04N 5/232*   (2006.01)

(52) U.S. Cl. ............... 348/207.99; 348/211.1; 348/231.7

(58) Field of Classification Search .......... 348/207.99, 348/211.1
See application file for complete search history.

(56) References Cited

U.S. PATENT DOCUMENTS

| | | | |
|---|---|---|---|
| 5,731,920 A | * | 3/1998 | Katsuragawa ............... 359/827 |
| 6,172,709 B1 | | 1/2001 | Yamano et al. |
| 6,373,524 B2 | | 4/2002 | Suda et al. |
| 6,717,618 B1 | * | 4/2004 | Yoshikawa ................. 348/360 |
| 6,753,918 B1 | * | 6/2004 | Kanayama ................. 348/335 |
| 6,822,684 B1 | * | 11/2004 | Suzuki et al. ............... 348/335 |
| 2002/0109784 A1 | | 8/2002 | Suda et al. |
| 2002/0118972 A1 | * | 8/2002 | Uenaka et al. .............. 396/532 |

FOREIGN PATENT DOCUMENTS

| | | |
|---|---|---|
| EP | 0 948 200 A2 | 10/1999 |
| JP | 9-9130 | 1/1997 |
| JP | 9-9131 | 1/1997 |
| JP | 9-9132 | 1/1997 |
| JP | 2000-066288 | * 3/2000 |

OTHER PUBLICATIONS

EPO Search Report issued May 6, 2004 for counterpart application EP 03255531.

* cited by examiner

*Primary Examiner*—Lin Ye
*Assistant Examiner*—Hung H. Lam
(74) *Attorney, Agent, or Firm*—Morgan & Finnegan, L.L.P.

(57) ABSTRACT

A lens apparatus, with which compatibility, regarding AF operations, to cameras of a variety of manufacturers can be established more easily, is disclosed. The lens apparatus includes a focus driver which drives a focus lens, a terminal which is a member for communication with the camera. Further, the apparatus includes a signal generating circuit into which an image-pickup signal output from the camera is input via the terminal, and which generates a focus driving signal for the focus driver based on the image-pickup signal.

3 Claims, 8 Drawing Sheets

AUTOFOCUS LENS APPARATUS AND IMAGE PICKUP SYSTEM

BACKGROUND OF THE INVENTION

1. Field of the Invention

The present invention relates to lens apparatuses performing AF (autofocus) control.

2. Description of the Related Art

In recent years, automatic focusing function (referred to in the following as "AF") has become indispensable in image-pickup apparatuses, such as consumer video cameras, broadcast cameras and professional cameras. The most common approach for AF systems is to extract a signal corresponding to the sharpness of an object based on the image-pickup signal, and to evaluate this signal to detect the focusing state of the optical system.

Figure 8:
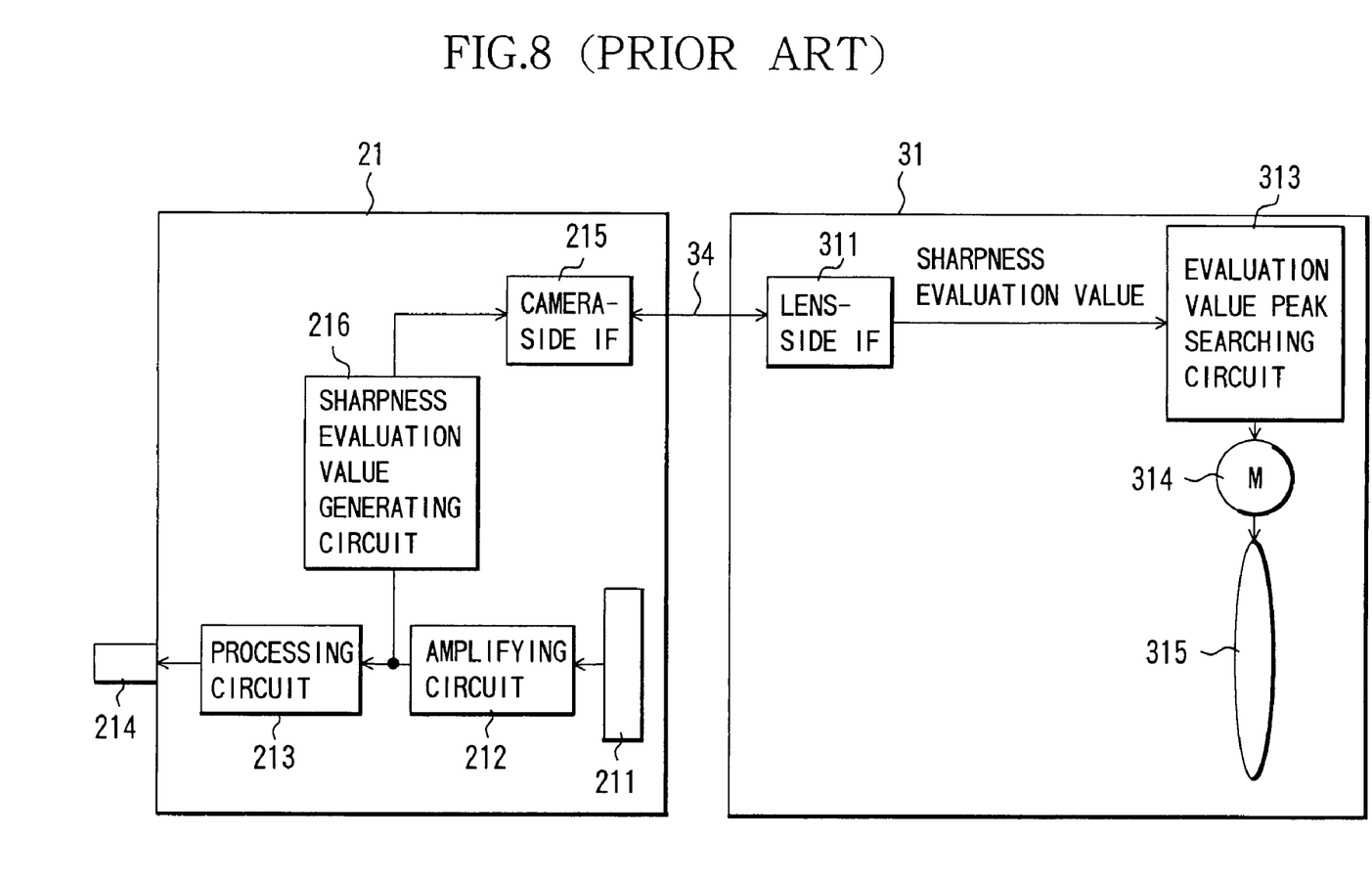
FIG. 8 is a block diagram illustrating the structure of a conventional image-pickup system.

An example of the operation of this AF approach is described with reference to FIG. 8. In FIG. 8, numerical reference 31 denotes an exchangeable lens apparatus, numerical reference 21 denotes a camera, and numerical reference 34 denotes a camera cable.

In the camera 21, numerical reference 211 denotes an image-pickup device, numerical reference 212 denotes an amplifying circuit that amplifies the output of the image-pickup device 211, and numerical reference 213 denotes a processing circuit that processes signals that have been amplified by the amplifying circuit 212 and formats them as NTSC or PAL signals or the like.

Numerical reference 214 denotes a video output terminal that outputs the video signal that is output from the processing circuit 213. Numerical reference 216 denotes a sharpness evaluation value generating circuit that receives the output of the amplifying circuit 212, extracts the sharpness of the video signal from that signal, and generates a sharpness evaluation signal.

Numerical reference 215 denotes a camera-side interface (IF) that creates and transmits various kinds of control information that are necessary for the lens control, such as the AF evaluation value that is output by the sharpness evaluation value generating circuit 216.

In the lens apparatus 31, numerical reference 311 denotes a lens-side IF that receives the control information and the sharpness evaluation value that are output from the camera-side IF 215 via the camera cable 34.

Numerical reference 313 denotes an evaluation value peak searching circuit that generates a signal driving a motor 314 such that the sharpness evaluation value that is successively input from the lens-side IF 311 at the vertical synchronization takes on a peak value.

The motor 314 is actuated by a motor driving signal from the evaluation value peak searching circuit 313, and numerical reference 315 denotes a focus lens that is moved in the optical axis direction by rotating the motor 314.

A light flux that has passed through the focus lens 315 is formed an image on an image-pickup plane of the image-pickup device 211. A signal that has been photo-electrically converted by the image-pickup device 211 is subjected to a sample-and-hold process and is input into the amplifying circuit 212. The amplifying circuit 212 amplifies the signal to a suitable level, and inputs it into the processing circuit 213 and the sharpness evaluation value generating circuit 216. The processing circuit 213 formats the input signal into a video format such as NTSC or PAL, and outputs it to the video output terminal 214. On the other hand, the sharpness evaluation value generating circuit 216 filters the signal that has been input, generates, at each vertical synchronization period, a digital evaluation signal that indicates the sharpness of the video signal from frequency components included in the video signal, and outputs it as a sharpness evaluation value to the camera-side IF 215.

The camera-side IF 215 transmits to the lens apparatus 31 with this evaluation value and other information necessitated by the lens apparatus 31

The lens-side IF 311 outputs the received information to the circuits within the lens apparatus 31, and outputs for example the sharpness evaluation value to the evaluation value peak searching circuit 313. The evaluation value peak searching circuit 313 generates a driving signal for the motor 314, and searches the position of the focus lens 315 at which the sharpness evaluation value takes on a peak, while driving the motor 314 and comparing the sharpness evaluation values that are input into it at each vertical synchronization period.

It should be noted that the video AF operation of camera systems employing this structure is discussed in detail in Japanese Patent Laid-Open Nos. H9(1997)-9130, H9(1997)-9131 and H9(1997)-9132 (corresponding to U.S. Pat. No. 6,373,524).

On the other hand, ordinary camera systems for broadcasting or professional use are connected with a 12-pin or 36-pin camera cable 34 for serial or parallel communication to exchange the control information that is necessary for the lens control.

In order to communicate the sharpness evaluation value between the lens apparatus 31 and the camera 21 by serial transmission, strict compatibility between the lens apparatus 31 and the camera 21 is required. For this reason, in cases in which the lens apparatus 31 and the camera 21 are supplied by different manufacturers, as is often the case with broadcasting or professional camera systems, it has to be ensured that the interfaces of the different manufacturers are compatible with one another.

However, it is difficult to promote a uniform standard, because signals necessary for the AF operation, such as the sharpness evaluation value, are what is most characteristic of the autofocus operation of each camera manufacturer.

SUMMARY OF THE INVENTION

It is an object of the present invention to provide a lens apparatus and an image-pickup system, with which compatibility, regarding the AF operation, to cameras of a variety of manufacturers can be established more easily.

In order to attain this object, a lens apparatus according to one aspect of the present invention includes a focus driver which drives a focus lens, a terminal which is a member for communication with the camera. Further, the apparatus includes and a signal generating circuit into which an image-pickup signal output from the camera is input via the terminal, and which generates a focus driving signal for the focus driver based on the image-pickup signal.

A lens apparatus according to another aspect of the present invention includes a focus driver which drives a focus lens, a terminal which is a member for communication with the camera, a signal extraction circuit which extracts the image-pickup signal from the combined signal of the control signal and the image-pickup signal input from the camera via the terminal. Further, the apparatus includes a signal generating circuit which generates a focus driving signal for the focus driver based on the image-pickup signal extracted by the signal extraction circuit.

A lens apparatus according to yet another aspect of the present invention includes a driver, a first terminal which is a member for communication with a first camera having communication function according to a first communication format, a second terminal which is a member for communication with a second camera having second communication function according to a second communication format. Further, the apparatus includes a circuit which outputs a driving signal to the driver based on a signal received at the second terminal when the lens apparatus is mounted to the first camera.

Furthermore, an image-pickup system in accordance with the present invention can be configured by combining any of the above lens apparatuses with a camera.

These and further objects and features of the lens apparatus and the image-pickup system of the present invention will become apparent from the following detailed description of preferred embodiments thereof taken in conjunction with the accompanying drawings.

DETAILED DESCRIPTION OF THE PREFERRED EMBODIMENTS

The following is a detailed description of embodiments of the present invention, with reference to the accompanying drawings.

Embodiment 1

Figure 1:
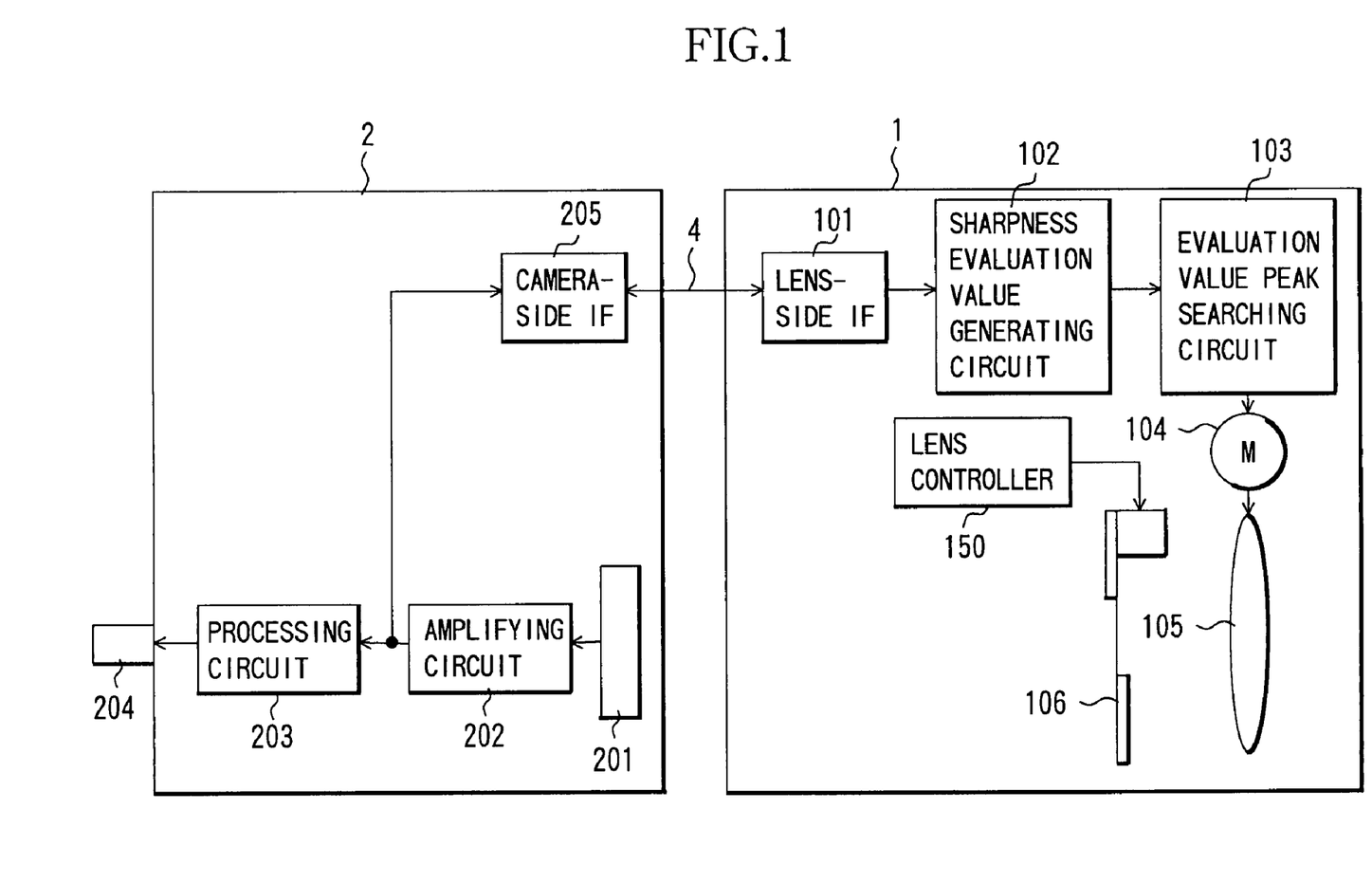
FIG. 1 shows the structure of an image-pickup system in accordance with Embodiment 1 of the present invention.

FIG. 1 shows the structure of an image-pickup system in accordance with Embodiment 1 of the present invention. In FIG. 1, numerical reference 1 denotes an exchangeable lens apparatus in accordance with the present invention, and numerical reference 2 denotes a camera. Numerical reference 4 denotes a camera cable that forms a plurality of transmission paths between the camera 2 and the lens apparatus 1, and is made of a plurality of core lines (communication lines) that are bundled together.

In the camera 2, numerical reference 201 denotes an image-pickup device made of a CCD or a CMOS sensor. Numerical reference 202 denotes an amplifying circuit that amplifies the output of the image-pickup device 201. Numerical reference 203 denotes a processing circuit that processes signals that have been amplified by the amplifying circuit 202 and formats them as NTSC or PAL signals or the like. Numerical reference 204 denotes a video output terminal that outputs a video signal (image-pickup signal) that is output from the processing circuit 203.

Numerical reference 205 denotes a camera-side interface (IF) that outputs to the camera cable 4 the video signal that has been output by the amplifying circuit 202 and communicates information by a serial or a parallel communication format to the lens apparatus 1.

In the lens apparatus 1, numerical reference 101 denotes a lens-side IF that communicates with the camera-side IF 205 via the cable 4, and into which video signals are input. Numerical reference 102 denotes a sharpness evaluation value generating circuit that generates a sharpness evaluation value indicating the sharpness of the video image, based on the video signal entered through the lens-side IF 101. Numerical reference 103 denotes an evaluation value peak searching circuit that generates a motor driving signal serving as a focus driving signal, such that the sharpness evaluation value becomes maximal. The sharpness evaluation value generating circuit 102 and the sharpness evaluation value peak searching circuit 103 together constitute a driving signal generating circuit.

Numerical reference 104 denotes a motor serving as a focus driving unit (driver) that is actuated by the motor driving signal from the evaluation value peak searching circuit 103. Numerical reference 105 denotes a focus lens that is moved in an optical axis direction by rotating the motor 104.

Numerical reference 150 is a lens controller, which carries out the various kinds of control of the lens apparatus 1. Numerical reference 106 denotes an iris (aperture stop), which constitutes an image-taking optical system together with the focus lens 105 and a variator lens that is not shown in the drawings. The aperture diameter of the iris 106 is controlled by the lens controller 150.

A light flux coming from an object that have passed through the image-taking optical system 105 is formed an image on the image-pickup plane of the image-pickup device 201. The signal that is photo-electrically converted by the image-pickup device 201 is subjected to a sample-and-hold process and is input into the amplifying circuit 202. The amplifying circuit 202 amplifies the signal to a suitable level, and inputs it into the processing circuit 203 and the camera-side IF 205.

The processing circuit 203 formats the input signal into a video format such as NTSC or PAL, and outputs it to the video output terminal 204. The camera-side IF 205 communicates various kinds of information, including the video signal, to the lens-side IF 101 of the lens apparatus 1.

Here, it would seem possible to input the image-pickup signal from the camera 2 into the lens apparatus 1 and to generate the signals necessary for the autofocus operation, such as the sharpness evaluation value, with the, circuit inside the lens apparatus 1. But in prior arts, the core lines within the 12-core or 36-core cables (i.e. cables with 12 or 36 pins) that are used for connecting the camera 2 and the lens apparatus 1 are all defined in order to enable bi-directional serial or parallel communication between the camera 2 and the lens apparatus 1. Therefore, new definitions for those core lines have to be realigned in order to input the image-pickup signal from the camera 2 to the lens apparatus 1.

Figure 2:
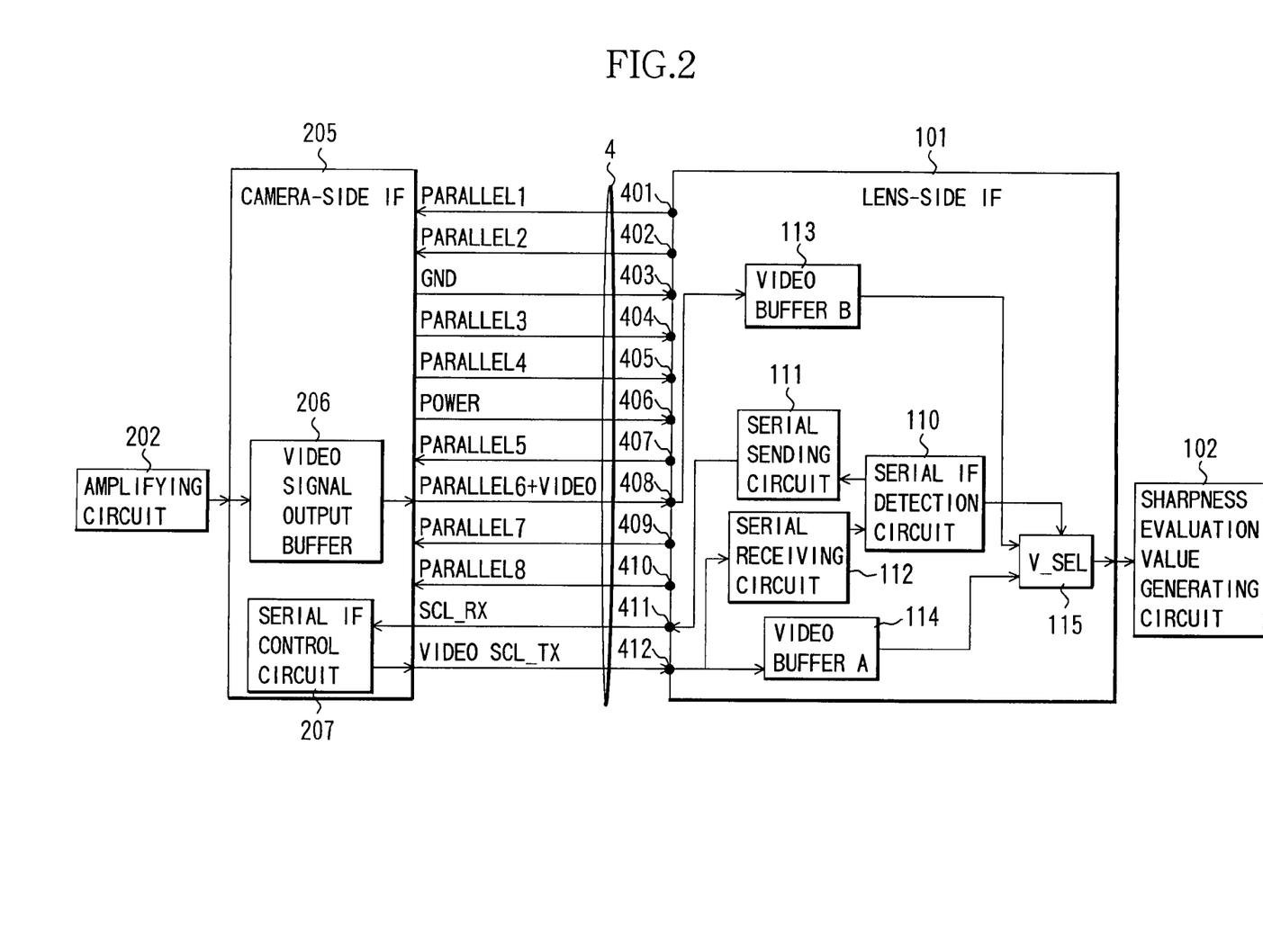
FIG. 2 is a block diagram showing the structure of the communication IFs of a camera and a lens apparatus that constitute an image-pickup system in accordance with Embodiment 1.
Figure 3:
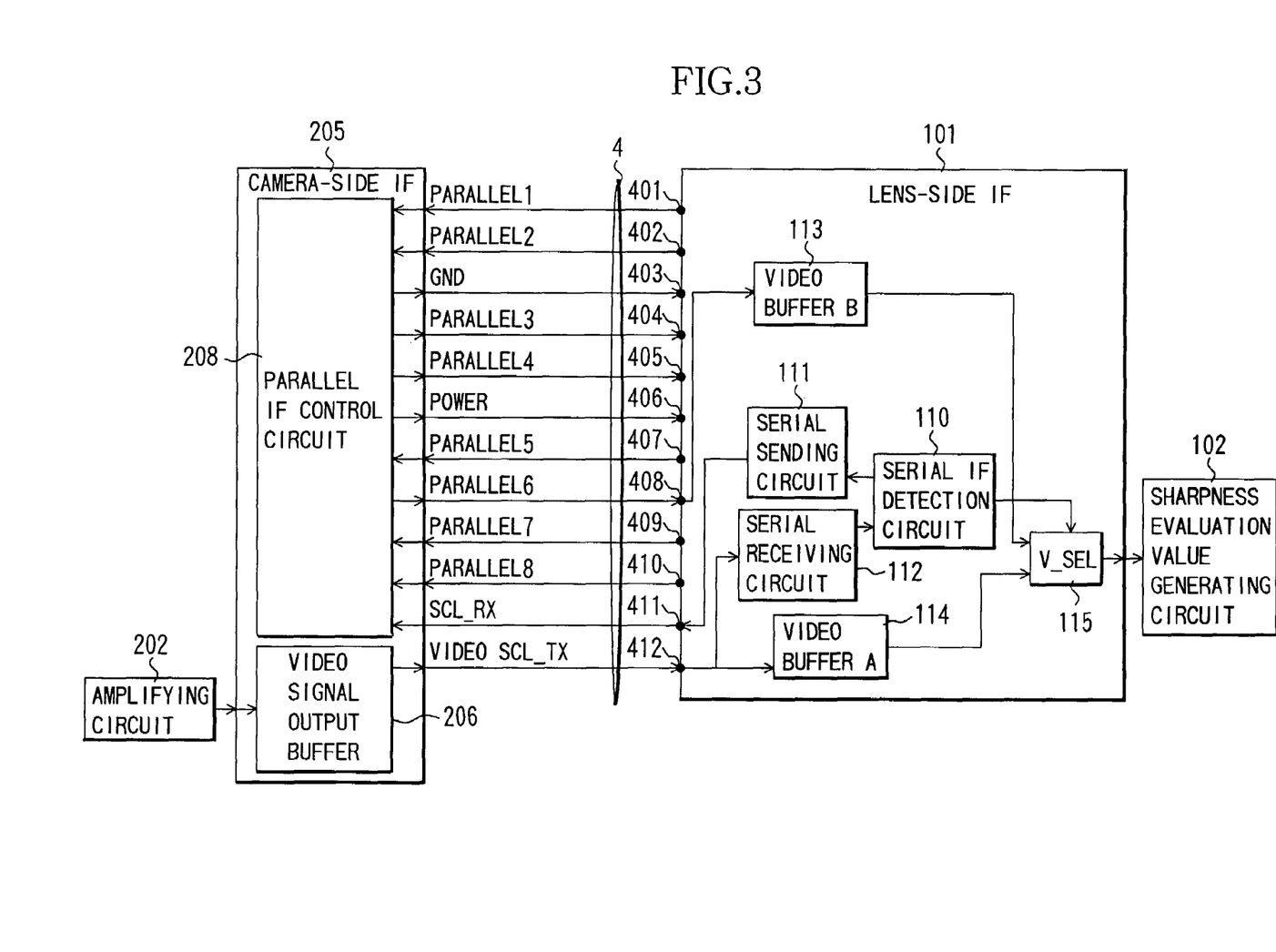
FIG. 3 is a block diagram showing the structure of the communication IFs of a camera and a lens apparatus that constitute an image-pickup system in accordance with Embodiment 1.

Referring to FIG. 2 and FIG. 3, the following is a more detailed description of the communication between the camera 2 and the lens apparatus 1. It should be noted that FIG. 2 illustrates the case that the lens apparatus 1 is mounted to a camera provided with a serial communication function, whereas FIG. 3 illustrates the case that the lens apparatus 1 is mounted to a camera provided with a parallel communication function.

In these drawings, numerical references 401, 402, 404, 405, and 407 to 410 denote communication terminals, numerical reference 406 denotes a power supply terminal, and numerical reference 403 denotes a ground terminal. Furthermore, numerical references 411 and 412 are communication terminals that are mainly used for serial communication. It should be noted, however, that the communication terminal 408 also can be used for serial communication, and the communications 411 and 412 also can be used for parallel communication. The power supply terminal and the communication terminals 401 to 412 are provided on a connector (not shown in the drawings), and the terminals are connected to the core lines of the camera cable 4 that are respectively assigned to each of the terminals.

In the lens-side IF 101 of the lens apparatus 1, numerical reference 110 denotes a serial IF detection circuit that detects a serial communication state. Numerical reference 111 denotes a serial sending circuit that sends information in a serial communication format via the communication terminal 411 to the camera 2.

Numerical reference 112 denotes a serial receiving circuit that receives information in the serial communication format via the communication terminal 412 from the camera 2.

Numerical reference 113 denotes a video buffer B that temporarily stores the video signal that is input from the communication terminal 408. Numerical reference 114 denotes a video buffer A that temporarily stores a video signal that is input from the communication terminal 412.

Numerical reference 115 denotes a video signal selection circuit (V_SEL) that selects either the output of the video buffer B 113 or the output of the video buffer A 114, and outputs a video signal to the sharpness evaluation value generating circuit 102, in accordance with the control by the serial IF detection circuit 110.

Regarding the camera 2, FIG. 2 shows the general structure of the camera-side IF 205 for a camera 2 that is provided with a serial communication function, whereas FIG. 3 shows the general structure of the camera-side IF 205 for a camera 2 that is provided with a parallel communication function.

Numerical reference 206 denotes a video signal output buffer that outputs the video signal which is an output of the amplifying circuit 202 to the communication terminal 408 (in FIG. 2) or to the communication terminal 412 (in FIG. 3). Numerical reference 207 denotes a serial IF control circuit for communicating information in the serial communication format. Numerical reference 208 denotes a parallel IF control circuit for communicating information in the parallel communication format.

It should be noted that in the lens apparatus 1 in FIG. 3, the circuit for communicating various kinds of information to the parallel IF control circuit 208 has been omitted from the drawings, but such circuit is in fact provided, and handles the transfer of various kinds of information.

Referring to FIG. 2, the following is a description of the operation of the lens-side IF 101 for the case that the camera 2 is provided with a serial communication function.

When electric power is supplied from the camera 2 via the camera cable 4 and the power supply terminal 406 to the lens apparatus 1, the serial IF detection circuit 110 on the side of the lens apparatus 1 sends a start code (which is a code that has been determined in advance between the lens apparatus 1 and the camera 2) via the serial sending circuit 111, the communication terminal 411 and the camera cable 4 to the serial IF control circuit 207 on the side of the camera 2.

After confirming the start code, the serial IF control circuit 207 sends a response code (which is a code that has been determined in advance between the lens apparatus 1 and the camera 2) via the camera cable 4, the communication terminal 412 and the serial receiving circuit 112 on the side of the lens apparatus 1 to the serial IF detection circuit 110.

By detecting the response code with the serial IF detection circuit 110, it is determined that the mounted camera 2 has a serial communication function, and communication by the serial communication format with the camera 2 is established. At the same time, the serial IF detection circuit 110 applies a selection control signal for inputting the output from the video buffer B 113 to the sharpness evaluation value generating circuit 102, to the video signal selection circuit 115. Thus, the video signal in the video buffer B 113 that has been sent from the camera 2 via the communication terminal 408 is input into the sharpness evaluation value generating circuit 102.

Referring to FIG. 3, the following is a description of the operation of the lens-side IF 101 for the case that the camera 2 is provided with a parallel communication function.

When electric power is supplied from the camera 2 via the camera cable 4 and the power supply terminal 406 to the lens apparatus 1, the serial IF detection circuit 110 on the side of the lens apparatus 1 sends a start code (which is a code that has been determined in advance between the lens apparatus 1 and the camera 2) via the serial sending circuit 111, the communication terminal 411 and the camera cable 4 to the parallel IF control circuit 208 on the side of the camera 2.

The parallel IF control circuit 208 cannot confirm this start code at this time, so that no response code is output. The serial IF detection circuit 110 is in a standby state for a predetermined time during which it waits for detection of the response code, and when this predetermined time elapses, the standby state is ended. Thus, the serial IF detection circuit 110 determines that the mounted camera 2 is provided with parallel communication function, and communication by the parallel communication format with the camera 2 is established.

At the same time, the parallel IF control circuit 208 applies to the video signal selection circuit 115 with a selection control signal for inputting the output from the video buffer A 114 to the sharpness evaluation value generating circuit 102. Thus, the video signal in the video buffer A 114 that has been sent from the camera 2 via the communication terminal 412 is input into the sharpness evaluation value generating circuit 102.

In FIG. 1, the sharpness evaluation value generating circuit 102 into which the video signal has been input generates, at each vertical synchronization period, a sharpness evaluation value signal, which is obtained by extracting high-frequency components from the video signal by a filtering process, etc., and outputs this sharpness evaluation value signal to the evaluation value peak sending circuit 103. While driving the motor 104, the evaluation value peak searching circuit 103 successively compares at each vertical synchronization period a plurality of the sharpness evaluation values that are generated at each vertical synchronization period, and generates such a motor driving signal that the focus lens 105 is moved to a position at which the sharpness evaluation value becomes maximal. Thus, the focus lens 105 is moved to an in-focus position.

By configuring the lens apparatus 1 as described above, it is possible to generate a sharpness evaluation value and to achieve an AF operation on the side of the lens apparatus 1 based on the video signal sent from the camera 2 without realigning the details of the definitions for serial communication and parallel communication, by altering the structure of a conventional lens apparatus only slightly.

Moreover, even if the camera 2 does not have the function to output video signals to a camera cable 4, detecting the periodicity of the video synchronization signal and stopping the AF function makes it possible to ensure that no problems occur.

Embodiment 2

Figure 4:
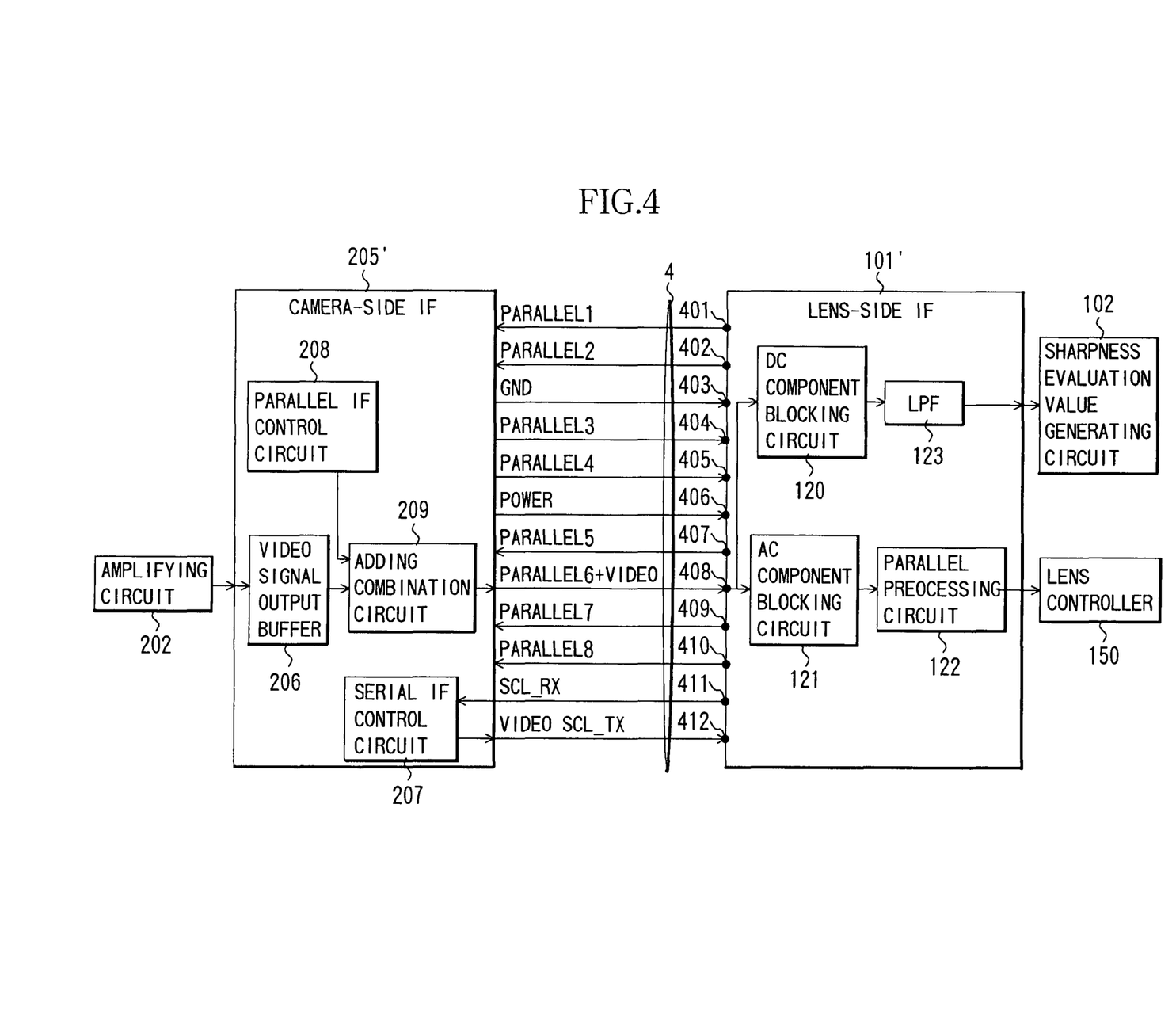
FIG. 4 is a block diagram showing the structure of the communication IFs of a camera and a lens apparatus that constitute an image-pickup system in accordance with Embodiment 2 of the present invention.

FIG. 4 illustrates the structure of a camera-side IF 205' and a lens-side IF 101' in a camera and lens apparatus configuring an image-pickup system according to Embodiment 2 of the present invention. In this embodiment, structural elements of the camera-side IF 205' and the lens-side IF 101' that are the same as in Embodiment 1 have been given the same numerals, and their further description has been omitted. The basic structure of the camera and the lens apparatus according to the present embodiment is the same as in Embodiment 1.

In this embodiment, a video signal that has been obtained by the camera 2 is added (combined) in an analog manner to a control signal with relatively little level fluctuations that has been sent as a parallel communication signal from the camera 2 to the lens apparatus 1. An example of the control signal with relatively little level fluctuations is a signal for setting the lens apparatus 1 to a mode in which the adjustment of the iris (aperture stop) 106 mounted to the lens apparatus 1 shown in FIG. 1 is carried out automatically by the lens controller 150, or to a mode in which the adjustment of the iris 106 is carried out manually by the camera operator, the voltage level of the signal varying in accordance with the mode.

In FIG. 4, numerical reference 209 in the camera-side IF 205' denotes an adding combination circuit that additionally combines the output of the parallel IF control circuit 208 and of the video signal output buffer 206 in an analog manner.

Numerical reference 120 in the lens-side IF 101' denotes a DC component blocking circuit (video signal extracting circuit) that receives the combined signal that is output by the adding combination circuit 209 (i.e. the signal obtained by additionally combining the control signal and the video signal) via the camera cable 4 and the communication terminal 408, and blocks direct current (DC) components in that received signal.

Furthermore, numerical reference 121 denotes an AC component blocking circuit that receives the combined signal that is output by the adding combination circuit 209 via the camera cable 4 and the communication terminal 408, and blocks frequency (AC) components in that received signal to extract the control signal.

Numerical reference 122 denotes a parallel processing circuit that processes the output of the AC component blocking circuit 121 as the control signal, which is a parallel communication signal. Numerical reference 123 denotes a low-pass filter (LPF) that limits the bandwidth of the output of the DC component blocking circuit 120.

Figure 5:
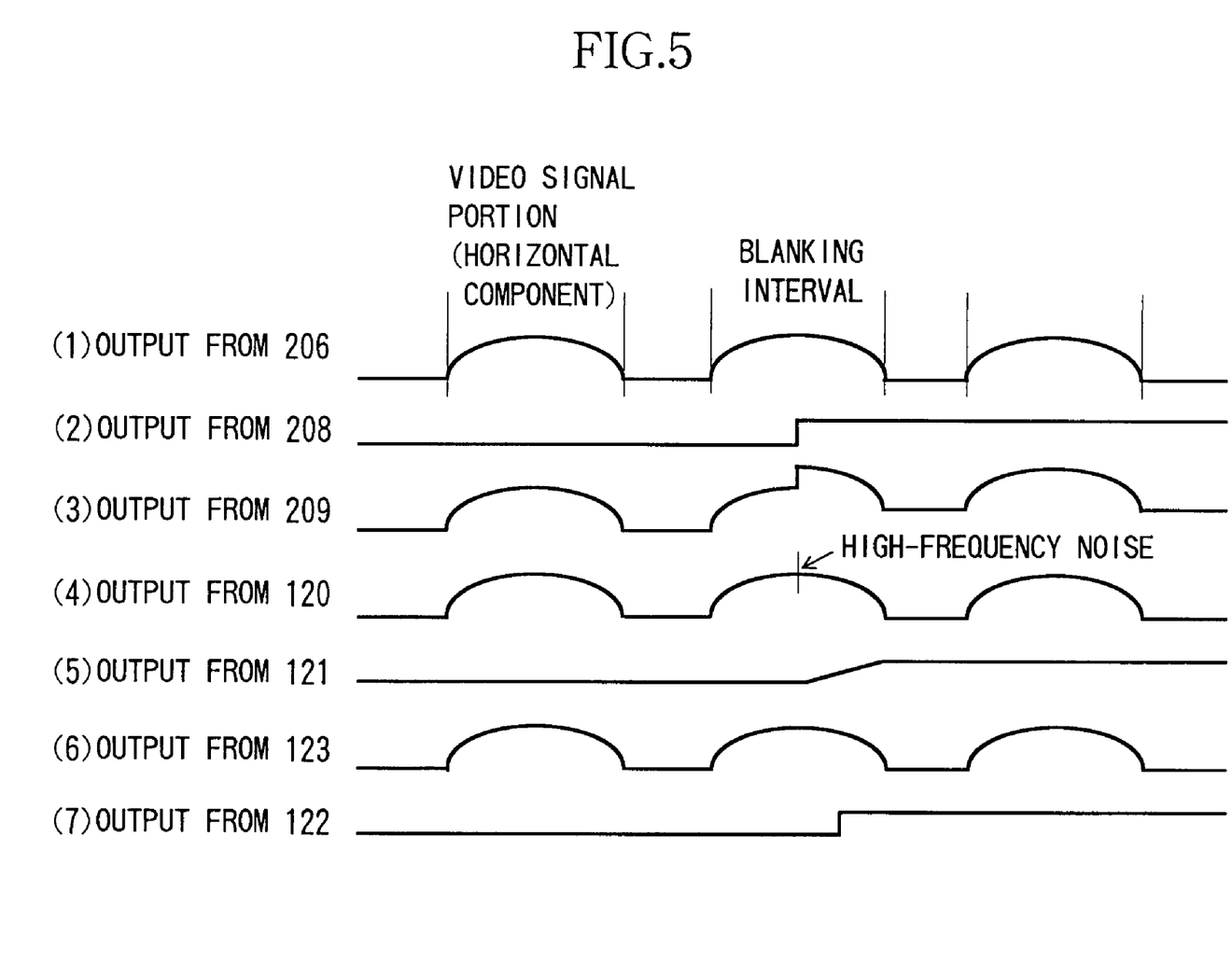
FIG. 5 is a timing chart illustrating the operation timing of Embodiment 2.

The operation of this embodiment is explained using the charts shown in FIG. 5, which illustrate signals from the amplifying circuit 202 to the sharpness evaluation value generating circuit 102. It should be noted that the numerals given next to (1) to (7) in FIG. 5 correspond to the numerals of the structural elements in FIG. 4.

Here, the camera 2 is provided with a switch (not shown in the drawings) for selecting between the automatic and the manual iris adjustment mode. The parallel IF control circuit 208 generates a control signal (referred to as "level signal" in the following) that is assigned to a high voltage level or a low voltage level in accordance with the information of the switch settings, and sends this level signal by parallel communication via the camera cable 4 and the communication terminal 408 to the lens apparatus 1.

The level signal (shown in FIG. 5 (2)) generated by the parallel IF control circuit 208 and the video signal that is output from the video signal output buffer 206 (shown in FIG. 5 (1)) are input into the adding combination circuit 209. The adding combination circuit 209 additionally combines the two inputs in an analog manner (shown in FIG. 5 (3)), and sends the result via the camera cable 4 and the communication terminal 408 to the DC component blocking circuit 120 and the AC component blocking circuit 121 on the side of the lens apparatus 1.

The AC component blocking circuit 121 blocks the video signal components (AC components) with a low-pass filter (not shown in the drawings) with large time constant (shown in FIG. 5 (5)), and inputs the thereby extracted level signal into the parallel processing circuit 122. The parallel processing circuit 122 sends an instruction signal to the lens controller 150 that switches the iris adjustment mode to automatic or manual, in accordance with the level of the level signal that has been entered. It should be noted that at this time, the level signal is delayed as shown in FIG. 5 (7) due to the influence of the AC component blocking circuit 121, but the setting of the iris adjustment mode does not have to be controlled instantaneously, so that no particular problem occurs.

On the other hand, the DC component blocking circuit 120 blocks the level signal component (DC component) within the combined signal that has been sent from the side of the camera 2, and extracts (restores) the video signal (horizontal component) shown in FIG. 5 (1). At this time, the video signal may fluctuate due to the change of the level signal (shown in FIG. 5 (2)) caused by the parallel IF control circuit 208. For example, the video signal that is output from the DC component blocking circuit 120 contains an edge component due to the change of the level signal, indicated as "high-frequency noise" in FIG. 5 (4). However, this edge component is eliminated by the LPF 123, which is set up such that it lets only the video band pass as shown in FIG. 5 (6).

Then, the video signal that has been restored by passing through the DC component blocking circuit 120 and the LPF 123 is entered into the sharpness evaluation value generating circuit 102.

At each vertical synchronization period, the sharpness evaluation value generating circuit 102, into which the video signal is input, generates a sharpness evaluation value signal, which is obtained by extracting high-frequency components from the video signal by a filtering process, etc. Then, a sharpness evaluation value signal is output to the sharpness evaluation value peak searching circuit 103 (see FIG. 1), as explained for Embodiment 1. Thus, the focus lens 105 can be moved to an in-focus position.

By configuring the lens apparatus 1 as described above, it is possible to generate a sharpness evaluation value and to achieve an AF operation on the side of the lens apparatus 1 based on the video signal sent from the camera 2 without realigning the details of the definitions for serial communication and parallel communication. Also in the camera-side IF 205', it is possible to handle the sending of the video signal with a circuit of small size.

Embodiment 3

Figure 6:
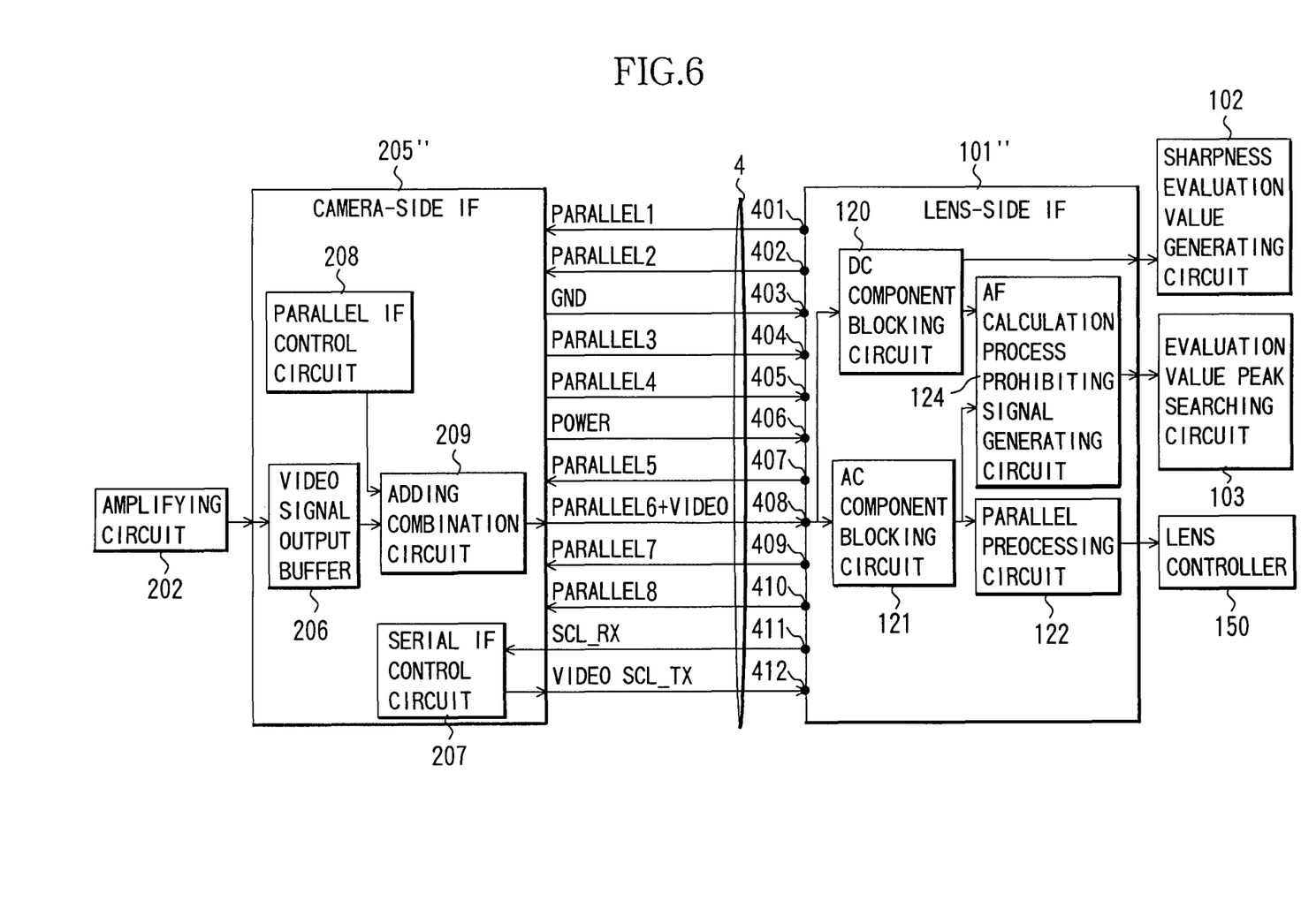
FIG. 6 is a block diagram showing the structure of the communication IFs of a camera and a lens apparatus that constitute an image-pickup system in accordance with Embodiment 3 of the present invention.

FIG. 6 shows the structure of a camera-side IF 205"0 and a lens-side IF 101" in a camera and a lens apparatus configuring an image-pickup system according to Embodiment 3 of the present invention. In this embodiment, structural elements of the camera-side IF 205" and the lens-side IF 101" that are the same as in Embodiments 1 or 2 have been given the same numerals, and their further description has been omitted. The basic structure of the camera and the lens apparatus according to the present embodiment is the same as in Embodiment 1.

In this embodiment, when an edge component is generated in a video signal as a result of a change in the level signal for setting the iris adjustment mode, as described in Embodiment 2, then the sharpness evaluation value based on this video signal is not used for the AF process.

In FIG. 6, numerical reference 124 denotes an AF process prohibiting signal generating circuit (prohibiting signal output circuit) that detects fluctuations in the level signal that is sent from the AC component blocking circuit 121 by parallel communication, and generates a signal prohibiting the AF calculation process using a synchronization signal that is extracted from the video signal component, which is the output of the DC component blocking circuit 120. It should be noted that the lens-side IF 101" is not provided with the low-pass filter 123 provided in Embodiment 2.

Figure 7:
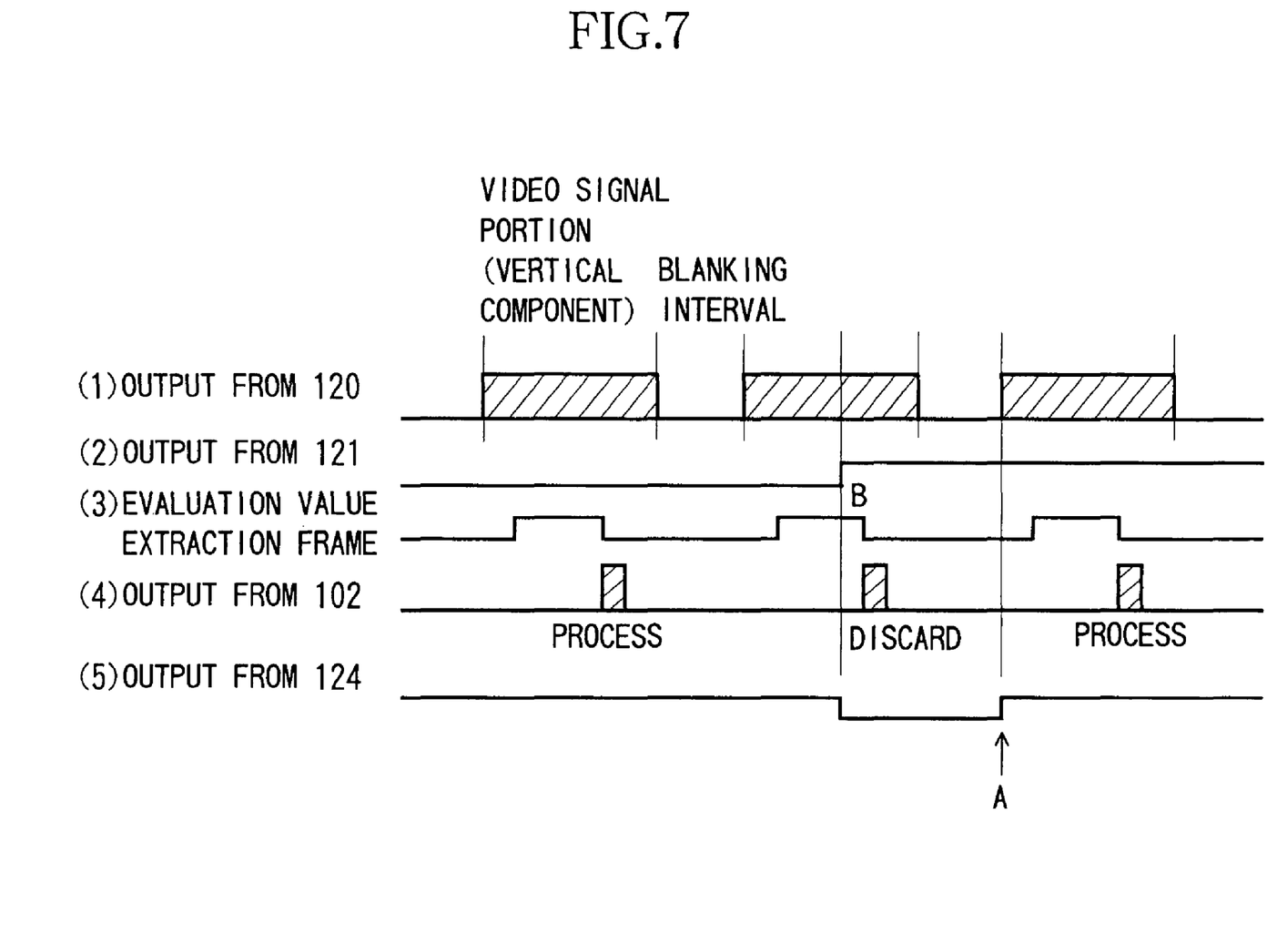
FIG. 7 is a timing chart illustrating the operation timing of Embodiment 3.

The operation of this embodiment is explained using the charts shown in FIG. 7, which illustrate signals in its vertical synchronization periods. It should be noted that the numerals given next to (1) to (5) in FIG. 7 correspond to the numerals of the structural elements in FIG. 6.

A level signal (shown in FIG. 7 (2)) that has been restored from the combined signal, which is output from the AC component blocking circuit 121, and a vertical synchronization signal extracted from the video signal that has been restored with the DC component blocking circuit 120 are input into the AF prohibiting signal generating circuit 124 and converted into a gate signal, as shown in FIG. 7 (5). That is to say, using the timing at which the level of the entered level signal changes and the vertical synchronization signal, a prohibiting signal is generated whose level changes at a starting timing A of an effective video area of the video signal (vertical component).

This prohibiting signal is input into the evaluation value peak searching circuit 103. While the prohibiting signal has been input into the evaluation value peak searching circuit 103, sharpness evaluation values that are generated by the sharpness evaluation value generating circuit 102 are discarded, as shown in FIG. 7 (4). Moreover, sharpness evaluation values that are generated while no prohibiting signal is being entered are employed for the AF process following thereafter (as indicated by "process" in FIG. 7 (4).

FIG. 7 (3) illustrates an extraction frame signal for specifying the video region (evaluation value extraction frame) within the video signal which is used for the generation of the sharpness evaluation value.

The transfer of the sharpness evaluation value signal from the sharpness evaluation value generating circuit 102 to the evaluation value peak searching circuit 103 is performed at the timing of the falling flank of this extraction frame signal (see FIG. 7 (4)), so that during the period in which the prohibiting signal is at low level, a sharpness evaluation value signal including the influence of the point of the change of the level signal (point B in FIG. 7(2))) is transferred. Consequently, the sharpness evaluation value signal that has been transferred during the period in which the prohibiting signal is at low level is discarded by the evaluation value peak searching circuit 103, and while successively comparing the sharpness evaluation value signal that is unaffected by the change of the level signal (i.e. that has been transferred during the period in which the prohibiting signal is not at low level) at each vertical synchronization period, a motor driving signal is generated such that the focus lens 105 is moved to the position at which the sharpness evaluation value becomes maximal. Thereby, the focus lens 105 is moved to the in-focus position.

By configuring the lens apparatus 1 as described above, a correct AF control can be carried out using a more reliable sharpness evaluation value.

It should be noted that in this embodiment, if the amplification circuit 202 sets the voltage level of the video signal lower than a low level threshold of the serial communication signal, then, even without the AC component blocking circuit 121, the parallel processing circuit 122 can perform a proper threshold judgment, and the control signal can be extracted.

As explained above, with the above embodiments, it is not necessary anymore to communicate signals that are necessary for AF operation and for which uniform standardization is difficult (such as the sharpness evaluation value) from the camera to the lens apparatus, and compatibility can be easily established between the lens apparatus and the camera.

Moreover, using the redundancy in the communication terminal assignment in lens apparatuses that are capable of communication by a serial communication format as well as by a parallel communication format, the image-pickup signal can be input via the communication terminals that are assigned to the communication format that is not the communication format with which the camera complies. Thus, it is possible to input the image-pickup signal from the camera to the lens apparatus without adding new core lines to the cable connecting the camera and the lens apparatus.

Moreover, since the image-pickup signal can be sent to the lens apparatus utilizing the communication terminals that are used for communicating a control signal (preferably a control signal whose level does not change frequently during image-pickup) from the camera to the lens apparatus, it is possible to input the image-pickup signal from the camera to the lens apparatus without adding new core lines to the cable connecting the camera and the lens apparatus.

It should be noted that when a level change occurs in the control signal included in the combined signal which is generated by combining the image-pickup signal and the control signal sent from the camera, then it is possible to generate a proper focus driving signal unaffected by the noise due to that level change, by restricting the generation of the focus driving signal based on the image-pickup signal in the driving signal generating circuit.

While preferred embodiments have been described, it is to be understood that modification and variation of the present invention may be made without departing from the scope of the following claims.

What is claimed is:

1. A lens apparatus mountable to a camera comprising:
   a focus driver which drives a focus lens;
   a parallel communication terminal for performing communication with the camera by a parallel communication format;

a serial communication terminal for performing communication with the camera by a serial communication format;

a signal generating circuit which generates a focus driving signal for the focus driver based on a video signal output from the camera;

a first image input circuit into which the video signal is input from the camera through the parallel communication terminal;

a second image input circuit into which the video signal is input from the camera through the serial communication terminal;

a communication format determination circuit which determines the communication format with which the camera complies; and a video signal selection circuit which is adapted to select the video signal input into the first and second image input circuits, wherein, when the communication format determination circuit has determined that the camera complies with the serial communication format, the video signal selection circuit outputs the video signal, which has been input into the first image input circuit, to the signal generating circuit, and a signal other than the video signal is communicated through the serial communication terminal; and wherein, when the communication format determination circuit has determined that the camera does not comply with the serial communication format or that the camera complies with the parallel communication format, the video signal selection circuit outputs the video signal, which has been input into the second image input circuit, to the signal generating circuit, and a signal other than the video signal is communicated through the parallel communication terminal.

2. The lens apparatus according to claim 1,
wherein the signal generating circuit calculates evaluation values each indicating the sharpness of an image, based on the video signal input from the camera, and generates the focus driving signal based on a comparison result of a plurality of the calculated evaluation values.

3. An image-pickup system comprising:
a lens apparatus according to claim 1; and
a camera to which the lens apparatus is mountable, and which sends a video signal to the lens apparatus.

* * * * *